May 14, 1935.  L. O. KELLEY  2,001,388

COIN OPERATED WEIGHING SCALE

Filed April 22, 1932   3 Sheets-Sheet 2

INVENTOR
Leonard O. Kelley
BY Swan, Frye & Hardesty
ATTORNEY

May 14, 1935. L. O. KELLEY 2,001,388
COIN OPERATED WEIGHING SCALE
Filed April 22, 1932  3 Sheets-Sheet 3

INVENTOR
Leonard O. Kelley
BY Swan, Frye & Hardesty
ATTORNEY

Patented May 14, 1935

2,001,388

UNITED STATES PATENT OFFICE 2,001,388

COIN OPERATED WEIGHING SCALE

Leonard O. Kelley, Detroit, Mich., assignor to The Standard Computing Scale Company, Detroit, Mich., a corporation of Michigan Application April 22, 1932, Serial No. 606,863

7 Claims. (Cl. 194—35)

The present invention relates to weighing scales and particularly to coin or check operated personal weighing scales.

Heretofore, with most personal scale constructions, it has been possible to "cheat" the scales, that is, weigh two or more persons successively on such scales for a single fee, by the simple expedient of depositing the coin for the first and having the second step on the scale as the first steps off, thus maintaining the mechanism in the released condition.

Further, in many scales it is possible to release the mechanism without using the coin, simply by violently shaking.

Among the objects of the invention is to overcome these difficulties and provide a mechanism which will properly weigh a person but which, upon small movement toward zero position after such weighing will release certain elements so that the dial immediately returns to zero, and weight indication is no longer given until the entire mechanism is allowed to return to rest position and again coin-released.

Another object is the provision of such a scale mechanism which, if shaken violently will itself release certain elements and thereby prevent weighing.

Still other objects will readily occur to those skilled in the art upon reference to the following description and the accompanying drawings in which Fig. 1 is a view in front elevation of part of a personal weighing scale mechanism embodying the present invention.

Fig. 3 is an enlargement of part of Fig. 1 showing certain parts in other positions.

Fig. 4 is another enlargement of certain parts of Fig. 1.

Figs. 5, 6 and 7 are enlarged detail views of certain of the parts.

Figure 1:
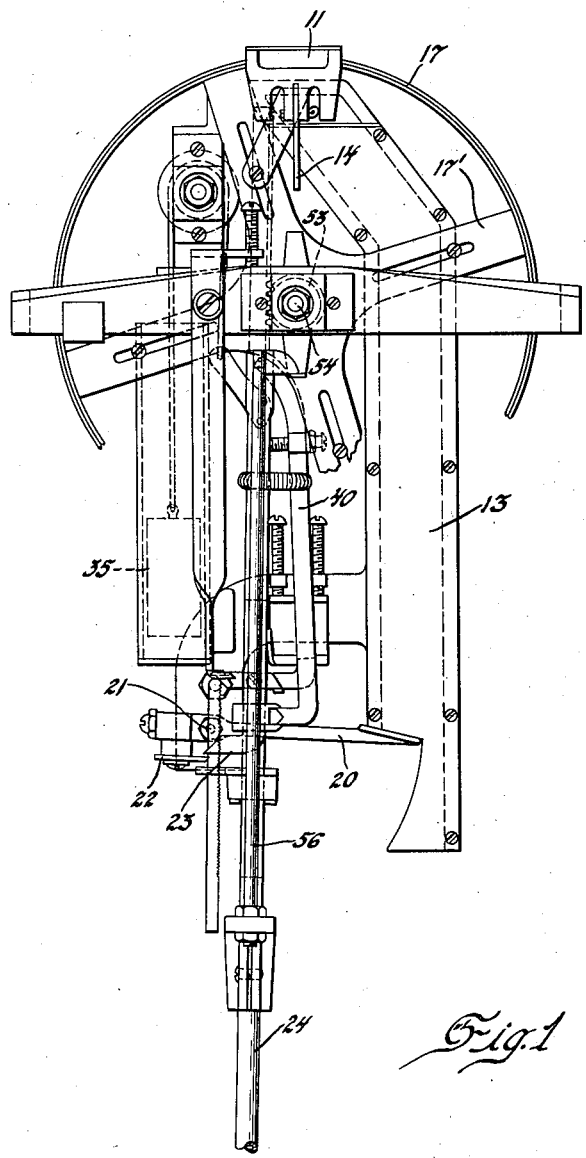
Figure 2:
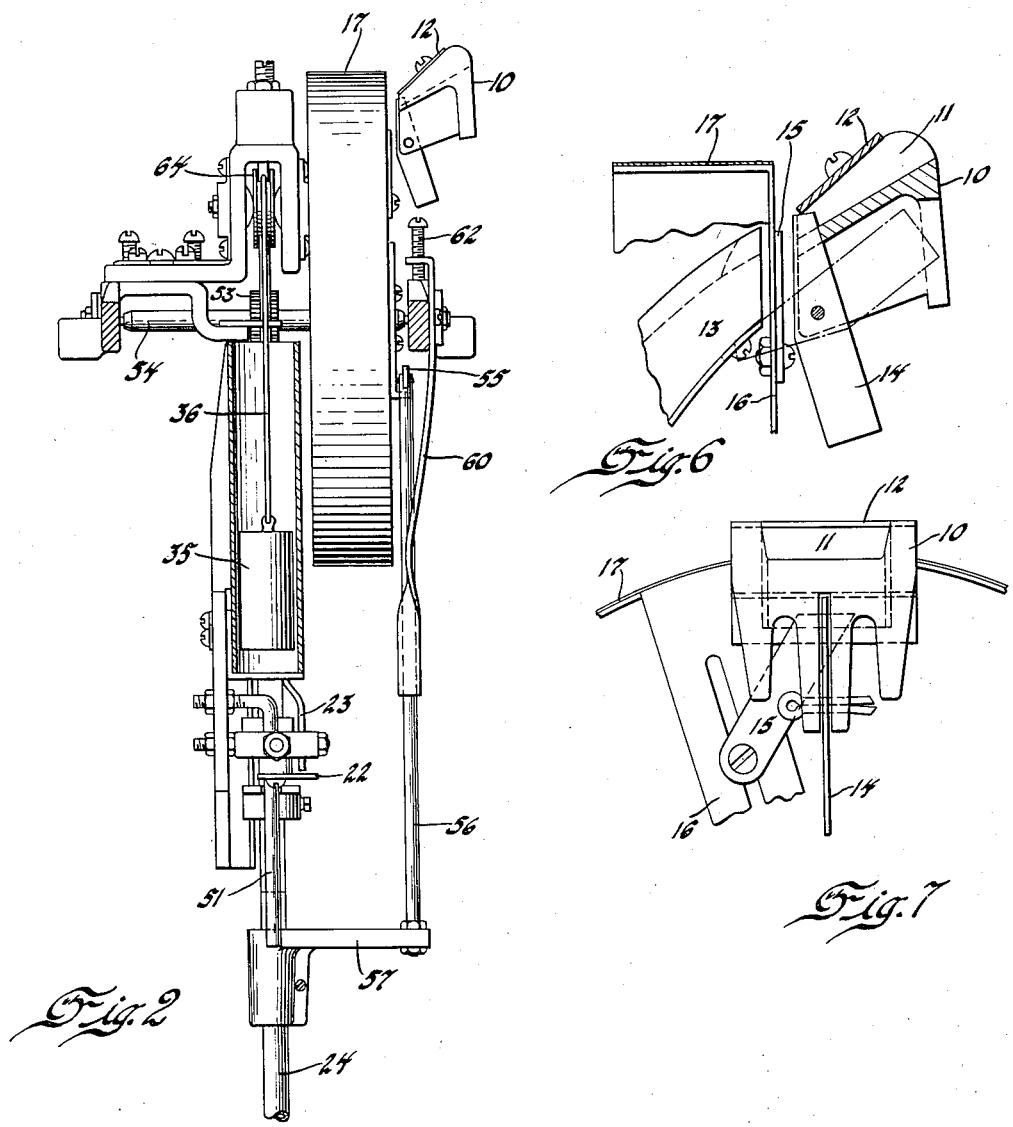
Fig. 2 is a view in elevation of the same as from the left of Fig. 1 and with parts in section.

Referring particularly to Figs. 1, 6 and 7, a coin deposit slot element is shown at 10, the slot 11 being covered by a plate as 12. A coin deposited in said slot before the customer steps upon the scale is prevented from passing into the chute 13 by the lever 14, which is blocked against tipping (see full line position, Fig. 6) by the plate 15 mounted on one of the spokes 16 of the indicating drum 17. If the customer first steps upon the scale and then deposits the coin in the slot, the parts are so arranged as to permit a small movement of the drum to move plate 15 out of line of lever 14, which then, being over-weighted by the coin, momentarily assumes the dotted line position shown in Fig. 6, and the coin is free to pass down the chute 13.

Normally blocking the end of the chute 13 is a lever 20, pivoted at 21, and adapted to be tripped by a coin falling thru the chute into a cash box or other suitable receptacle (not shown) which may be arranged therebeneath. The lever, on its opposite end with respect to the pivot pin, carries a blade-like dog 22 adapted to project below the stop member 23 carried by the rack rod, which is indicated as a whole by the numeral 24. When the lever 20 is struck by the coin it rotates about its pivot and releases the dog 23, allowing the rack rod 24 to go down under a load upon the platform (not shown) for providing weight indication thru a proportionate actuation of the drum dial 17 by means of the pinion 53 fastened upon the drum shaft 54 and meshing with the rack 33.

Figures 3, 4, 5:
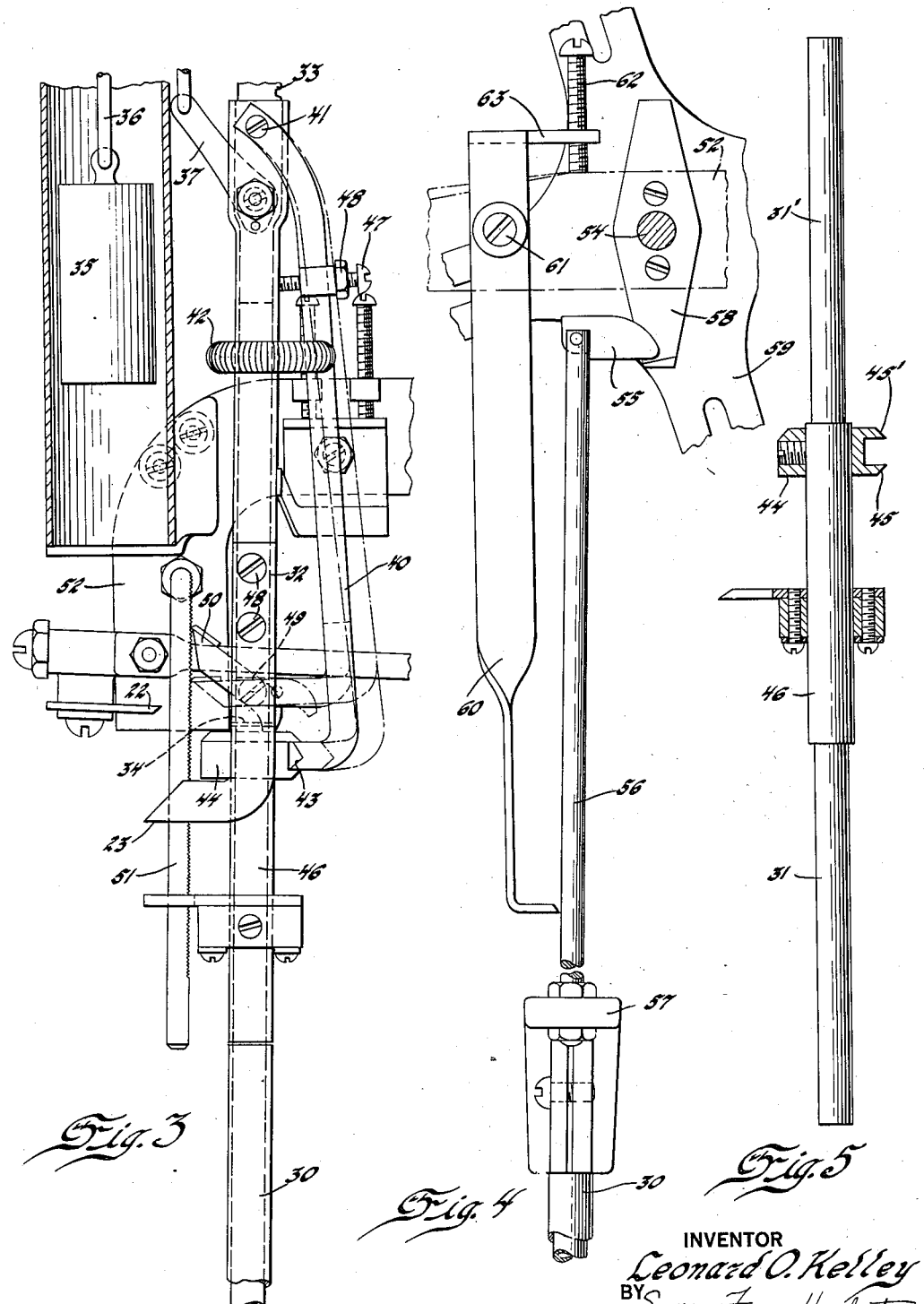

The connecting rack or steelyard rod is, as shown best in Figs. 3 and 5, formed in three pieces, of which the lower portion comprises a tubular member 30 extending down to suitable connection with the weighing lever, platform and load counter-balancing means (not shown) in the lower part of the scale. The tubular member 30 telescopes the rod 31 integral with the portion 46 as shown in Fig. 5. To the central portion are affixed certain other elements which will later be described, while the stop member 23 is carried by the upper tubular portion 32 which also telescopes the upper rod portion 31' integral with the central section 46. The stop 23 is shown secured to the upper section by screws 48, and will be seen to extend downwardly beside the central section (note Figs. 3 and 5). The division of the rack rod to the several parts permits operation of the weighing levers and platform of the scale in the normal manner and without strain under load, whether or not a coin be dropped in the slot, yet permits maintaining the indicating mechanism inoperative when not released by a suitable coin, as will subsequently be apparent.

As best shown in Fig. 3, the upper telescoping portions 32 carries fixed to it the rack 33 and extends downwardly in this figure to the points indicated by the two parallel lines 34. This upper portion carries, in addition to the stop member 23, means for fixing together the upper portion 32 and the central portion 46. When the upper and central members are so secured together their combined weight is sufficient to overcome that of an opposed weight 35, secured to the member 32 by flexible means such as the cord 36, extending over a pulley 64 and fastened at its other end to member 32, as thru a suitable bracket 37. I have also satisfactorily employed in place of the weight a relatively long and light coiled tensile spring secured at its lower end to any suitable fixed portion of the scale. The weight of the upper member 32 and its attached parts, without the added weight of the central portion, is less than that of the weight 35, (or insufficient to overcome the tension of the spring) so that when the two parts 46 and 32 are disconnected, the part 32 and its attached elements will be pulled upwardly by the weight 35 as the latter descends (or by the spring).

The upper and central sections 32 and 46 are releasably fixed together thru the agency of the swinging arm 40 pivoted on and near the upper part 32 as at 41, and urged toward member 32 by means of a spring 42. The lower end of the arm 40 is bent at an angle and is notched as shown at 43 to adapt it to cooperate with a notched collar 44 fixed upon the central portion. Fig. 5 shows this collar in cross section and the notched end of arm 40 is so formed (note Fig. 3) that the lower lip of the notch extends outwardly a short distance beyond the upper lip, in order that the lower lip may catch the lower flange 45 of the collar and prevent the arm passing completely over collar 44 when the two parts approach each other in the closing operation to be described later. The limit of inward movement of the arm 40 is adjustably fixed by the stop screw 47 tapped in the arm, bearing against the upper section and is securable in adjusted positions by the jamb nut 48. In the normal operation of the scale in which the scale 23 is first freed by coin-effected release of the dog 22, a load imposed upon the scale platform causes the scale rod 30 to sink. The coupled upper and middle sections 32—46 being heavier than the weight 35 follow with it, proportionately actuating the drum dial thru the rack and pinion. In order to uncouple the upper and middle sections if even a slight movement of the rack rod assembly is permitted, I provide means for throwing the rod 40 out of the collar 44 whenever the rod assembly rises. For this purpose an integral branching arm 40' may extend laterally from the arm 40, carrying pivoted on its end, as upon pin 49, the pawl 50 adapted to cooperate with the fixed and relatively finely toothed ratchet 51, shown secured to the frame of the scale, which is fragmentarily shown at 53 and designated 52. As that view shows, the pawl is contoured to be ridable over the ratchet in both directions, but in order to ride over the teeth in the upward direction, the pawl must swing to the horizontal position, shown in dotted lines, at which position it will be seen to be forced by upward movement of the rod assembly. Such movement of the pawl forces the arm 40 to the right (as viewed in Fig. 3) to a position, also shown in dotted lines, in which it is clear of the catch 44. The weight, being heavier than the upper section and the members carried thereby, then pulls the upper section and the arm 40 upwardly, the pawl riding over the rack 51. This of course rotates the drum to the end of the scale, and no further weight indication can be furnished until the sections are again coupled. Such coupling cannot take place until the stop member 23 is above the dog 22 so that the latter must be moved from blocking position by insertion of another coin before another weighing operation can be performed.

As long as any load remains upon the platform the lower and central sections 30—46 remain in the downward position. When the load is removed, the lower and central rod sections again rise to the normal uppermost position which they occupy when at rest. As the collar 44 and the lower extremity of the arm 40 come together the slanting top surface 45' of the upper lip of the collar 44 forces the latching arm 40 outwardly, and as soon as the collar has moved upwardly sufficiently, the arm snaps into the latched position shown in full lines in Fig. 3, under the influence of gravity and the spring 42.

In order to assure positive forcing together of the upper and middle sections with adequate pressure to insure this snapping-latch action of the arm 40, means may be provided for positively forcing the upper section downwardly as the lower sections are forced upwardly by the load counter-balancing means. For this purpose I have provided a cam 55 secured to the lower section 30 of the arm rod assembly, as by means of the upstanding rod 56 carried by the bracket 57. As the cam rises, its curved upper surface is adapted to engage a follower member 58 secured to and rotatable with the drum 17 as by being secured to its spider 59, and to rotate the drum and so the pinion 53 in the proper direction to force downwardly the rack and thus the upper section of the tube which carries the same. This of course occurs as the rising lower and middle sections of the rod assembly complete their upward movement. Such forcing down of the upper section provides ample pressure to insure proper latching of the collar 44 and arm 40. Because of the necessarily lengthy and unsupported nature of the upstanding rod 56 which carries the cam 55, a bracing member as 60 may be provided to reinforce the rod 56 and prevent the cam 55 being forced back by the follower. The bracing member is shown secured to the frame 52 by a screw 61 and adjustable by means of an adjusting screw 62 threaded thru the offset upper arm 63 of the bracing member.

Now having described the invention and the preferred embodiment thereof, it is to be understood that the said invention is to be limited, not to the specific details herein set forth, but only by the scope of the claims which follow.

What I claim is:

1. Safeguarding means for use in conjunction with a weighing scale provided with load counterbalancing means, weight indicating means and a connecting rod assembly formed in a plurality of separable sections, in which said rod assembly extends between said means and is adapted to act in tension to operate the weight indicating means, a latch member for securing certain of the sections together to enable transmission of tensile stress therethrough, means for releasing the latch member to destroy the effectiveness of said rod assembly in tension, and means including a cam for forcing certain sections together and into latching position upon movement of the assembly in one direction.

2. Safeguarding means for use in conjunction with a weighing scale provided with load counterbalancing means, weight indicating means and a connecting rod assembly extending between said means formed in a plurality of separable sections, characterized by the fact that one such section is connected to the indicating means and another to the load counterbalancing means, together with means including a latch member for coupling certain of the sections together, means for releasing the latch member, means including a cam for forcing certain sections toward latched position upon movement of the section connected to the load counterbalancing means in one direction, and means for preventing unitary movement of said sections when unlatched.

3. Safeguarding means for a coin-controlled weighing scale provided with load counterbalancing means, load receiving means, a movable indicator, coin-operated releasing mechanism, and a coin chute, comprising means for preventing a coin from descending the chute until a load is placed upon the platform, including a blocking member extending into the chute, and means carried by the indicator for preventing movement of the blocking member out of the chute until the indicator has been moved from rest position.

4. Safeguarding means for a weighing scale provided with load counterbalancing and load receiving means and a movable indicator, comprising means for actuating the indicator including a rack rod assembly formed in a plurality of sections one of which carries the rack and is connected to the indicator, coupling means including a latch member adapted to secure the rack carrying section to another section when they are in abutting relation, means for releasing said latch member, means for positively forcing such sections together into latched relation upon return of the rod assembly to rest position, and means for preventing unitary movement of said sections when unlatched.

5. Safeguarding means for use in conjunction with a weighing scale provided with load counterbalancing and load receiving means, a rotatable indicator and means for actuating the indicator including a pinion, comprising a rack rod assembly formed in a plurality of sections one of which carries a rack meshing with the pinion, latching means for securing the rack-carrying section to another section of the rod during a weighing operation, means for releasing said latching means upon movement of the rod assembly toward rest position, means for forcing such sections into latched position, comprising a cam member actuable by the load counterbalancing means as the latter returns to rest position to turn the pinion and so force the rack-carrying section of the rod in a desired direction, and means for preventing unitary movement of said sections when unlatched.

6. In combination with a coin-controlled weighing scale provided with an actuable indicator, and means for motivating the indicator including a rod connected thereto, safeguarding means comprising a second rod forming an aligned continuation of and for actuating the first rod but movable independently thereof when unconnected thereto, means operable as the scale mechanism approaches the unloaded rest position for connecting the rods for unitary movement upon the next succeeding actuation of the scale, means for disconnecting the rod sections during the first part of the return movement of the rods and scale mechanism following unloading of the scale, and means for preventing unitary movement of said rods when disconnected, to prevent repeated actuation of the indicator if the scale is again loaded before the mechanism has been allowed to fully return to rest position.

7. In combination with a coin-controlled weighing scale having load counter-balancing and load receiving means, an indicator movable in response to loading of the latter, and coin-operable releasing mechanism including a coin chute, safeguarding means comprising a blocking member movable into and from the chute, and holding means for preventing movement of the blocking member from the chute, said holding means being movable in response to actuation of the indicator to release the blocking member and permit its movement from the chute.

LEONARD O. KELLEY.